United States Patent [19]

Johnson

[11] Patent Number: 4,879,146

[45] Date of Patent: Nov. 7, 1989

[54] COFFEE CARAFE

[76] Inventor: Kendrick A. Johnson, 8242 Queen Ave. S., Bloomington, Minn. 55431

[21] Appl. No.: 157,746

[22] Filed: Feb. 18, 1988

[51] Int. Cl.[4] .................... A47J 27/00; A47G 19/14
[52] U.S. Cl. .................. 428/35.7; 222/475.1; 428/215; 428/220; 215/1 C
[58] Field of Search ............ 524/392; 525/332.7; 528/170, 260; 220/94 R, 94 A; 222/475, 475.1; 428/35, 215, 220, 35.7; 215/1 C; 126/390; 432/264

[56] References Cited

U.S. PATENT DOCUMENTS

| | | | |
|---|---|---|---|
| 2,964,794 | 12/1960 | Peilstöcker et al. | 215/1 C |
| 3,114,484 | 12/1963 | Serio | 222/475.1 |
| 3,800,988 | 4/1974 | Karlen et al. | 222/475.1 |
| 3,847,867 | 11/1974 | Health et al. | 524/233 |
| 3,847,869 | 11/1974 | Williams, III | 528/170 |
| 3,850,885 | 11/1974 | Takekoshi et al. | 528/170 |
| 3,852,242 | 12/1974 | White | 528/170 |
| 3,855,178 | 12/1974 | White et al. | 524/392 |
| 4,432,340 | 2/1984 | Conant et al. | 126/390 |
| 4,503,168 | 3/1985 | Hartsing, Jr. | 523/100 |
| 4,526,920 | 7/1985 | Sakashita et al. | 524/850 |
| 4,539,370 | 9/1985 | Nouvertné et al. | 525/67 |
| 4,655,564 | 4/1987 | Czech | 351/41 |
| 4,673,708 | 6/1987 | Rock et al. | 525/66 |
| 4,695,602 | 9/1987 | Crosby et al. | 524/439 |

OTHER PUBLICATIONS

Sears catalog page illustrating glass coffee carafes (p. 906).

Primary Examiner—Ellis P. Robinson
Assistant Examiner—Archene A. Turner
Attorney, Agent, or Firm—Merchant, Gould, Smith, Edell, Welter & Schmidt

[57] ABSTRACT

The present invention is a coffee carafe formed of a thin walled polyetherimide and having characteristics permitting heating of the resinous carafe on a hot plate. The carafe is prepared by blow molding to form a thin wall construction.

11 Claims, 3 Drawing Sheets

U.S. Patent  Nov. 7, 1989  Sheet 1 of 3  4,879,146

COFFEE CARAFE

FIELD OF THE INVENTION

The present invention relates to containers and particularly food containers suitable for heating on a hot plate.

BACKGROUND OF THE INVENTION

Food containers suitable for heating have been available for many years and is today a highly developed art. One type of food container has been the coffee carafe typically used with coffee brewers. The coffee brewer will generally have a compartment for heating of water to a brewing temperature. The water is then expelled into a portion of the device containing ground coffee. The hot water brews into highly palatable coffee. Such coffee brewers have generally included a coffee carafe with a glass bowl and a polymeric handle. The handle may be secured to the bowl by use of a retractible metal band. Alternatively, the polymeric handle may include a polymeric ring that is fused to the upper portion of the glass bowl. Coffee brewers and glass coffee carafes can today be found in most homes, offices and building facilities.

While the glass coffee carafe has been a useful item, it has possessed several disadvantages. The glass coffee carafe, of course, has been highly susceptible to breakage. For example, if a glass coffee carafe is dropped onto a counter or a floor surface, it shatters producing dangerous glass fragments, creating substantial liability for businesses as well as suppliers of the coffee carafe. Such glass coffee carafes have also been susceptible to absorption of coffee oils. The coffee oil over time discolors the glass leaving a substantial deposit. The deposit may adversely affect the flavor of the brewed coffee resulting in a stale coffee flavor.

Various attempts have been made to overcome these disadvantages of the glass coffee carafe. Such attempts in the past have been unsuccessful. One such attempt has involved a carafe having a bowl made of polysulfone. The polysulfone carafe was unsatisfactory and was changed to a composite structure which is now commerically marketed as a carafe including a lower portion constructed of metal and an upper portion constructed of polysulfone. This unit likewise includes a handle which may be secured in place by fusion of the polymers. While this construction overcomes, at least to a certain degree, the breakage problem encountered in glass carafes, it has its own inherent disadvantages. For example, a seam exists between the metal portion and the polysulfone portion. Such seam permits accumulation of matter and thus creates potential for accumulation of bacteria and other unhealthful material. The seam also is a weakened area and may result in separation. Further, the polysulfone tends to degrade with repeated heating becoming discolored and unappetizing.

While a variety of food containers have been provided in the past made of polymeric materials, for example, polyethylene, such containers have not been suitable for heating, particularly on a hot plate, since prior polymeric materials have tended to become fused when heating to temperatures, for example, an excess of 300° F. Illustrative is the polysulfone material.

Applicant has discovered that the disadvantages of the glass coffee carafe, the composite metal and polysulfone coffee carafes and the existing polymeric food containers can be overcome. The present invention provides a container, e.g. polymeric coffee carafe which is transparent, which may be heated to temperatures well in excess of 300° F., e.g. 375° F. and higher, and is not fragile. Moreover, the present carafe is not susceptible to absorption of coffee oils. In fact, if coffee is boiled dry in the present carafe, a mere swishing of water will remove the coffee residue.

SUMMARY OF THE PRESENT INVENTION

The present invention is a polymeric container formed by blow molding of a polyetherimide resin. In the method of the present invention, a hollow cylindrical parison is first extruded of the polyetherimide with the parison weighing between about 80 and 110 grams. A blow tube is then inserted into the molten parison and a gaseous medium e.g. air at a pressure of about 100 p.s.i., g., is blown into the parison while the parison is disposed within a mold having the shape and size of the outside of the desired product. The parison is thus blown up much like a balloon until it is forced into shaping engagement with the mold. The blow molded product is then cooled to solidify the polymer and removed from the mold. The blow molded product then has the top surface cut away to provide the upper lip of the coffee carafe. The typical cycle is about 8 to 10 seconds.

The present carafe is heat stable to permit heating on a plate having a temperature of at least 190° F, typically a temperature of between 250 and 400° F. In one preferred embodiment a handle is molded into the unit during the blow molding process. In another embodiment, a handle is attached to the bowl, the coffee carafe, for example with a retractable metal band. The product of the present invention is a container of blow molded construction having a thin wall bowl and a handle. The walls, for example, may have a thickness of at least about 0.01 inches and no more than 0.03 inches, preferably about 0.015 to 0.025 inches. The walls are of polyetherimide resin and are semi-rigid and non-fragile. The present carafe is heat stable to permit heating on a plate having a temperature of at least 190° F., typically a temperature of between 250 and 400° F.

IN THE DRAWINGS

FIG. 1 schematically illustrates a conventional coffee brewer including a coffee carafe of the present invention;

DETAILED DESCRIPTION OF THE INVENTION

Figure 1:
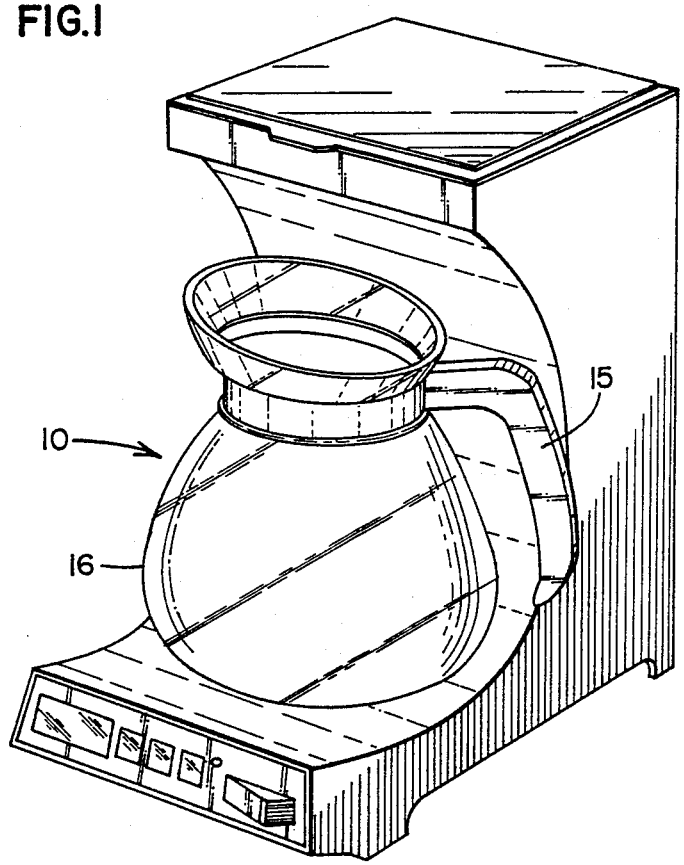
Figure 2:
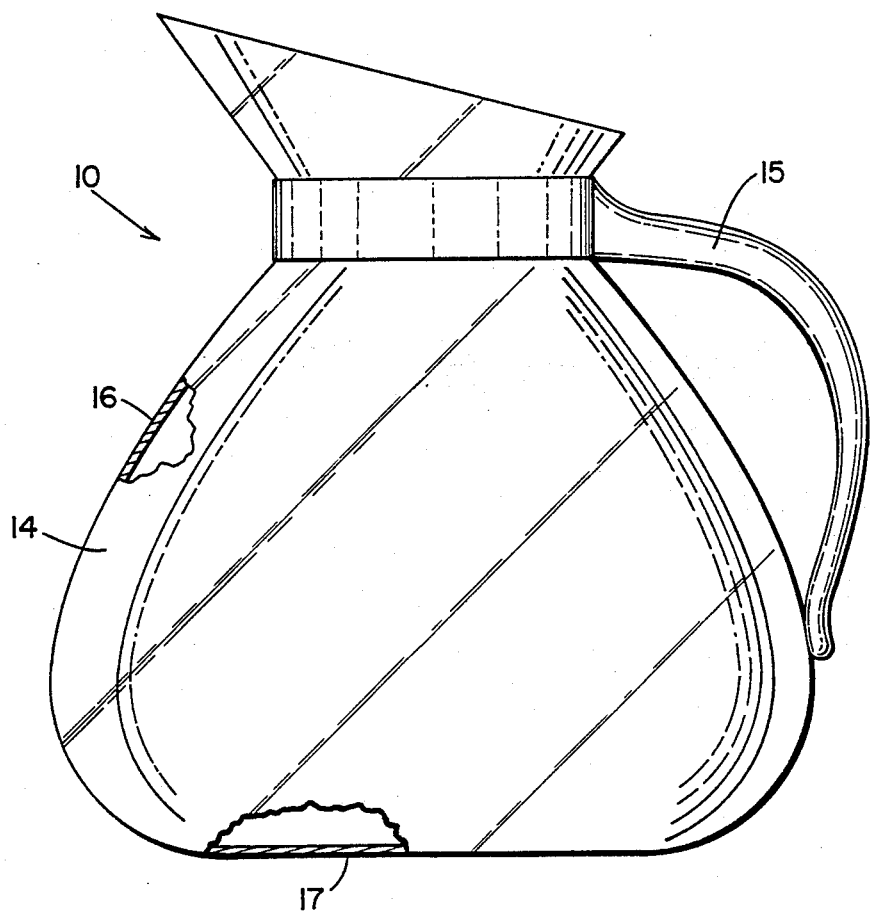
FIG. 2 illustrates a first embodiment of the present coffee carafe.

FIG. 1 illustrates the coffee carafe of the present invention in its normal use environment, positioned on the heating plate of a coffee brewer. The coffee carafe 10 (FIG. 2) of the present invention includes a bowl 14 and a handle 15. The bowl portion 14 is formed of polyetherimide. The bowl is of a thin wall construction having a side wall thickness of at least about 0.009 inches and desirably less than 0.03 inches in thickness. The side wall 16 of the bowl 14 is desirably of about ½ of thickness of the base 17 of the bowl portion. The base may have a minimum thickness of at least 0.015 inches up to 0.06 inches. For example, the base 17 of the bowl portion 14 may be 0.022 inches and the side wall about 0.011 inches. The present carafe may itself be heated to temperatures of at least 375° F.

It has been found that the thickness is critical for several reasons. First, the base 17 in contact with a hot plate of the brewer must be thin to permit heat transfer through the polyetherimide. If the base is thickened, heat is accumulated in the lower side of the bottom wall. The polyetherimide tends to be an insulating material that does not readily transfer heat. Thus, the unit is very inefficient if the bottom wall is too thick e.g. more than 0.06 inches. If the side wall 16 is thickened, for example, more than 0.06 inches in thickness, the side wall 16 tend to be fragile and crack and break.

The polyetherimide used in the present invention may be produced as disclosed in U.S. Pat. Nos. 3,847,867; 3,847,869; 3,850,885; 3,852,242 or 3,855,178. These disclosures are incorporated herein by reference for purposes of teaching the production of the polyetherimide. The present polyetherimide desirably is an unreinforced polyetherimide having a molecular weight of about 19,000 and has a glass transition temperature in excess of 400° F. The carafe of the present invention was tested under stress to determine if crazing would occur. At a temperature of 180° F. and a stress of 3200 p.s.i. no crazing occurred following 14 days. No crazing occurred at a temperature of 194° F. and a stress of 2400 p.s.i. even after 14 days. The carafe was found to have a Rockwell hardness of M109.

A parison is extruded in the shape of a hollow cylinder of a length suitable for blow molding the present coffee carafe. It has been found that approximately 80 to 110 grams of parison is appropriate for a coffee carafe of the conventional size. The parison is then blown to form a bubble shaped by the mold interior surface. The mold is then opened and the coffee carafe is opened at the upper end to provide a lip and pouring spout by cutting away the upper portion. Next a handle may be attached to the bowl. This may be of any of the conventional types used with respect to glass coffee carafes. For example, the conventional unit including a metal band attached to a plastic or resinous handle. The metal band may be tightened by a screw mechanism to securely grip the upper portion of the bowl. The mechanism includes a screw extruding through the band into a plug both of which fit into a socket molded into the handle. Alternatively, the handle may be a polymeric injection molded handle and ring with the ring being fused to the upper portion of the bowl such as by suitable adhesives or welding.

Figure 3:
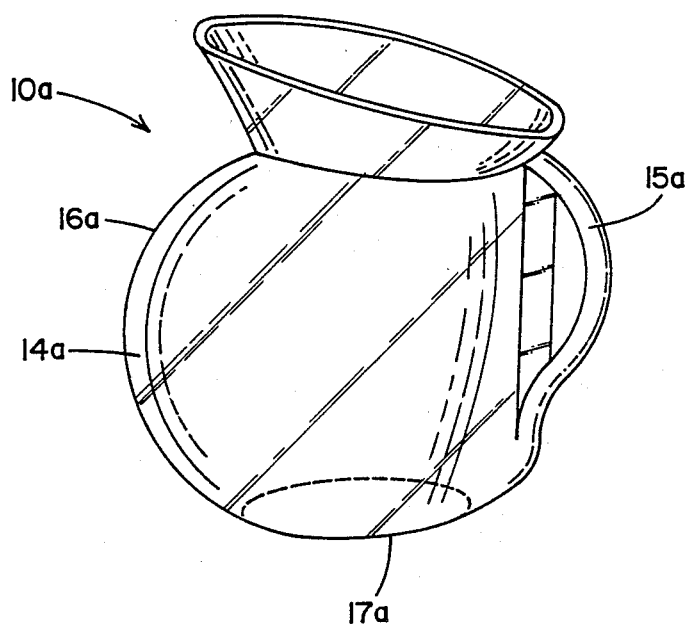
FIG. 3 illustrates another embodiment of the present coffee carafe.

An alternative embodiment 10a the present invention is illustrated in FIG. 3. In this instance, the entire carafe, including the side wall 16a, base 17a and handle 15a, is formed during the blow molding process. The bowl may be of the same material as described with regard to the embodiment illustrated in FIGS. 1 and 2, however, in this instance, the handle is formed by molding a portion of the parison into the desired handle shape as the mold is closed around the parison. The bowl portion is then formed by blow molding the parison. The wall thicknesses may be as described with regard to the embodiment illustrated in FIG. 2. The handle portion may be ½ inch to ¾ inch in width and having a thickness of perhaps 1/16 to ⅛ of an inch. As illustrated in FIG. 3, a thickened rib is provided along each edge of the handle. The thickened rib may be about ⅛ to 3/16 of an inch in thickness. This provides for strengthening and stability of the handle during use.

While preferred embodiments are described, various modifications can be made without departing from the broader scope of the present invention. For example, the present invention can be a vessel or container other than a coffee carafe. Such vessel is of a type that must encounter high temperatures such as a medical vessel which must encounter sterilization temperatures. Also, another resin that may be used is polyethersulfone.

What is claimed is:

1. A coffee carafe suitable for heating on a hot plate having a temperature of at least 190° F., said carafe comprising a bowl and an integral handle being formed by blow molding and having a side wall thickness of between about 0.1 and 0.06 inches and a base thickness of between about 0.015 up to 0.06 inches, said side wall and said base consisting of unreinforced polyetherimide being heat stable to permit heating of said carafe on said hot plate, said polyetherimide having molecular weight of about 19,000 and glass transition temperature of at least 400° F.

2. The coffee carafe of claim 1 wherein said carafe is heat stable on a coffee heating plate to a plate temperature of at least about 375° F.

3. The coffee carafe of claim 1 suitable for heating on a hot plate having a temperature of about 250° to 400° F., said polyetherimide having a stability to heat of a temperature of at least 375° F.

4. The coffee carafe of claim 3 wherein said bowl portion is blow molded of polyetherimide resin and having a side wall thickness of between 0.01 and 0.03 inches and a base thickness of between 0.015 and 0.06 inches.

5. The coffee carafe of claim 4 wherein said handle is removably attached to said bowl.

6. The coffee carafe of claim 4 wherein said handle is molded integral with said bowl.

7. The coffee carafe of claim 4 wherein said bowl has a side wall thickness of between 0.015 and 0.025 inches.

8. The coffee carafe of claim 7 wherein said handle includes a metal band which surrounds an upper portion of said bowl, said handle portion having adjustment means to tighten said handle into supporting engage with said bowl.

9. The coffee carafe of claim 3 wherein said bowl includes a flared upper portion which provides a pouring spout.

10. The coffee carafe of claim 6 having a side wall thickness of about 0.02 inches, said polyetherimide being heat stable to permit heating of said carafe on a coffee heating plate having a temperature of at least 400° F.

11. A heat stable vessel suitable for heating on a hot plate of at least 190° F. consisting of unreinforced polyetherimide having a side wall with a thickness of between 0.01 and 0.06 inches and a base of between about 0.015 up to 0.06 inches, said vessel being heat stable to a temperature of about 350° F., said polyetherimide having a molecular weight of about 19,000 and glass transition temperature of at least 400° F.

* * * * *